United States Patent [19]

Mercer

[11] 3,845,584

[45] Nov. 5, 1974

[54] GROWING OF GRASSES

[75] Inventor: Frank Brian Mercer, Blackburn, England

[73] Assignee: F. B. Mercer, Limited, Blackburn, England

[22] Filed: May 2, 1973

[21] Appl. No.: 356,426

[30] Foreign Application Priority Data
May 4, 1972 Great Britain.................. 20739/72

[52] U.S. Cl.......................... 47/56, 111/2, 161/146, 161/406, 161/DIG. 6
[51] Int. Cl............................................. A01g 1/00
[58] Field of Search....... 47/56, 58; 111/1; 161/146, 161/406, DIG. 6

[56] References Cited
UNITED STATES PATENTS

| 2,605,589 | 8/1952 | Kuestner | 47/56 |
| 2,876,588 | 3/1959 | Tietz et al. | 47/56 X |
| 2,923,093 | 2/1960 | Allen | 47/56 |
| 3,139,701 | 7/1964 | Nishiuchi | 47/56 X |
| 3,541,979 | 11/1970 | Lorenzen | 47/56 X |

FOREIGN PATENTS OR APPLICATIONS

| 461,018 | 11/1949 | Canada |
| 1,126,663 | 3/1962 | Germany |

Primary Examiner—Robert E. Bagwill
Attorney, Agent, or Firm—Stevens, Davis, Miller & Mosher

[57] ABSTRACT

For the growing of grass or the like to provide a readily liftable and transportable lamina of growing grass, viz. a turf or sod, a layer of flexible reticulate sheet material and a layer of sheet or film flexible material impermeable to root growth bonded together at a plurality of spaced points, areas or lines to form a weak lamina, the grass being grown on a rooting medium distributed over the said weak lamina, the layer of impermeable material being readily strippable from the reticulate material to expose the grass roots prior to laying the grass lamina in situ.

3 Claims, 5 Drawing Figures

GROWING OF GRASSES

This invention relates to a pre-fabricated lamina of growing grass, or other soil binding plants (hereinafter referred to, for brevity, as grass or grasses) adapted to be transportable and layable in final situ on a prepared earth surface whereafter the grass grows down into the earth so that the lamina becomes one with the earth.

In co-pending patent application No. 179,140 there is described a method of producing a grass-bearing lamina comprising placing a sheet of flexible reticulate material over a surface impermeable to penetration by plant roots, distributing over the surface of said flexible reticulate sheet a layer of rooting medium and an adequate quantity of grass seed (preferably pre-chitted) and subjecting the lamina to correct conditions of light, heat and moisture to promote germination whereby the conducting roots from each seed grow through the layer of rooting medium and through the meshes of said reticulate material so that the root system so produced bonds the rooting medium and the reticulate material sheet into a coherent unit of flexible laminar structure having at one surface growing grass blades and at the other surface (after removal from the impermeable surface) a root structure which will strike and grow into an earth surface on which the lamina is laid.

In the above mentioned co-pending patent application the impermeable surface preferably comprises a flexible sheet material such as polyethylene or polyvinylchloride film or heavy paper treated, for example, with polyvinyl-acetate. Such an impermeable surface material is used not only during the initial growing period (viz. lamina production) but also as a carrier for the lamina or laminae during handling and transportation or to interleave stacked layers of laminae or the coils of a rolled-up lamina, the impermeable surface material being removed from the lamina prior to final laying in situ.

The invention consists in a method of producing a grass-bearing lamina as described above with reference to the aforementioned co-pending patent application, wherein the flexible reticulate sheet material is pre-bonded or pre-laminated to a sheet or film of flexible impermeable material at a plurality of spaced localized points, areas or lines of adhesion whereby the reticulate sheet material is maintained in close or intimate contact with the adjacent surface of the impermeable sheet material while allowing access to the grass roots to find their way between the two sheets between the localised adhesion points, areas or lines.

The advantage of the invention as set out above is not merely ease of handling the structural materials of the lamina during production, but to minimise or eliminate the formation of cavities or voids between the two layers which can result in either the rooting compound getting washed through the reticulate layer into the voids or cavities, leaving thin or bald patches on the surface of the lamina, or the grass seeds becoming suspended over a void or cavity out of reach of the moisture which is normally retained on the surface of the impermeable layer; either of the above conditions will cause uneven growth or localised failure of the grass plants to thrive or even live.

Referring to the disclosure of the above mentioned co-pending patent application in which the reticulate layer may be integrally extruded square mesh plastics net, such a net is preferably bi-planar, that is to say the parallel strands of one set of strands lie in a plane parallel to the plane of the other parallel set of strands with which they are integrally joined at their crossing points. With such a net structure, if the net is laid on a surface one set of strands will be in contact with the surface and the other set will be for the most part spaced from the surface by the thickness of the underlying strands. If the square mesh is not integrally extruded (i.e., is knotted or woven) or if the net is extruded as either a mono-planar or bi-planar net, but with enlarged integral intersections (i.e., intersections whose cross-sectional depth is greater than the sum of the diameters of the strands of the two sets of strands of a bi-planar net or the diameter of the strands of a mono-planar net) even the underlying strands will not be fully in contact with the surface on which they are laid due to the projection of the knots or enlarged intersections or the weave of a woven net.

The impermeable sheet may be pre-printed with a pattern of localised adhesive depositions, e.g., dots, broken lines or a pattern of spaced hollow squares and brought into contact with the sheet of net to form a weakly bonded laminate, the net adhering to the impermeable sheet at spaced localised points only so that a substantial proportion of the net structure will be fractionally raised from or free of, the surface of the impermeable sheet as required to allow root penetration below the net strands.

Furthermore, confining of the adhesion between the two sheets to spaced localised points, areas or lines only, facilitates the stripping of the impermeable backing sheet from the grass-bearing lamina prior to laying. Alternatively the adhesive may be applied to the net, i.e., to one set of strands or prominent intersections on the side that is to be placed in contact with the impermeable backing sheet.

According to a preferred form of the invention, the net layer is bonded to the impermeable backing sheet by parallel, substantially continuous, lines of adhesive running longitudinally of the laminate and spaced, for example, three inches apart across the width of the net sheet. The lines of adhesive may take the form of filaments of a hot melt adhesive with or without a tensile core (e.g., polyester fibre), the net layer and backing sheet being fed between hot rollers with the filaments of adhesive intervening to cause the adhesive of the filaments to melt and bond the net weakly to the backing layer. A cooling or setting stage may immediately follow the hot rollers.

While it is preferred that the lines of adhesive run longitudinally of the laminate, they may alternatively run transversely of the sheer.

Since the laminate so-formed will be laid on flat ground prior to depositing the rooting medium thereon it is convenient to provide a selvedge of the impermeable backing sheet only along each margin of the sheet (which will be laid from a continuous roll) so that the selvedges can be forced into the previously tilled or loose ground in order to anchor the sheet in situ.

A roll of the laminate as described above can be mounted on a tractor and unwound onto the prepared ground in tandem with a trailing device having discs aligned with the selvedges to force them into the soil. Following, would be means for depositing an even layer of rooting compound and pre-chitted seeds onto the laid laminate.

In order to prevent excess of moisture due to accidental over-watering or heavy rain, the impermeable base sheet may be formed with perforations to allow the escape of excess water but would only allow a very small percentage of grass roots to find their way into the soil below.

In the accompanying drawings:

FIG. 1 is a cross-section of an enlarged scale of a biplanar net bonded to an impervious backing sheet layer to form a weak laminate for the growing of grass according to the present invention.

FIGS. 2 A to D shows diagrams or patterns of adhesive placed at spaced localised points areas or lines on the backing sheet to bond the net sheet thereto as a weak lamina.

Figure 1:
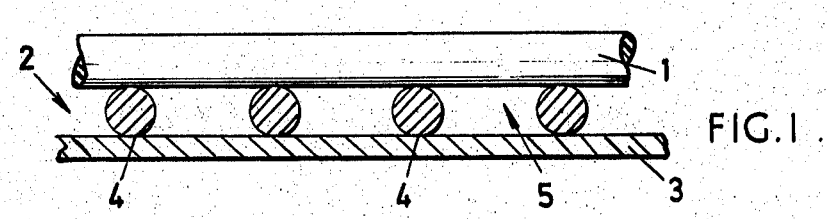
Figure 2:
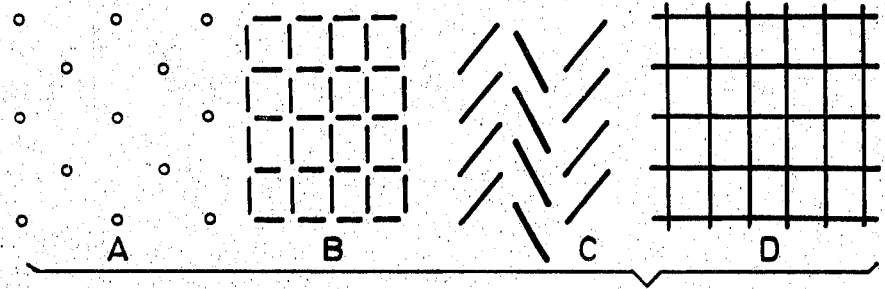

In carrying the invention into effect according to one mode by way of example incorporating a bi-planar net layer 1 in the laminate 2, the net layer 1 is bonded to an impermeable backing sheet layer 3 by spaced points (or lines) of adhesion 4. By this arrangement, access 5 is provided to allow root penetration below the net layer 1. FIG. 2 shows examples of patterns in which adhesive can be printed or otherwise applied to the backing sheet 3 to bond the net thereto; FIG. 2. A being spaced dots, B being broken squares or rectangles, C being a herring-bone pattern and D a square or rectangular pattern of continuous lines, alternatively only the longitudinal (vertical) or transverse (horizontal) lines may be used.

Figure 3:
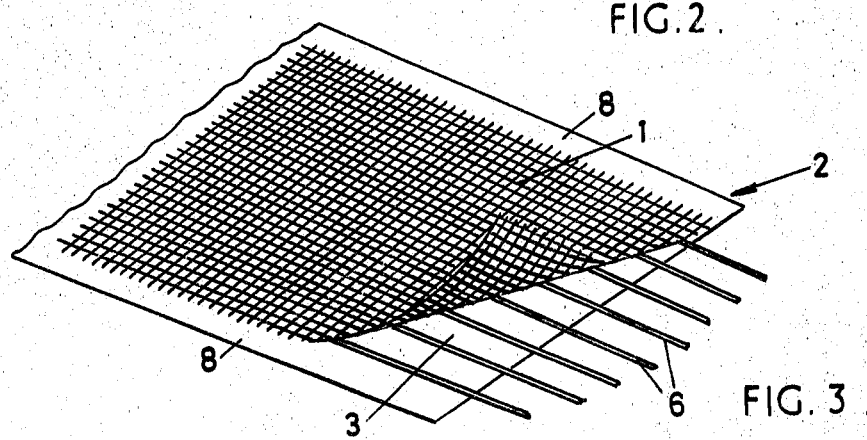
FIG. 3 is a perspective view of a laminate for growing grass according to the present invention wherein the net is weakly bonded to the backing sheet by lines of adhesive in the form of hot melt filaments.
Figure 4:
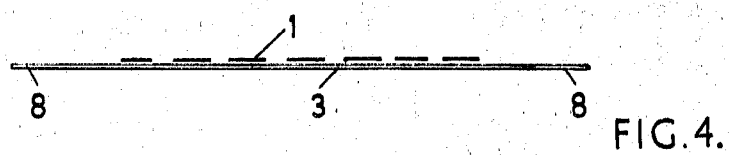
FIG. 4 is a diagrammatic cross-section of the laminate showing the backing sheet selvedges and FIG. 5 shows the laminate in situ (without the layer of rooting medium) with the selvedges forced into the soil.

In FIG. 3 there is shown a preferred method of weakly bonding the net layer 1 to the backing sheet 3 to form the laminate 2 by providing intervening parallel lines of filaments 6 of hot melt adhesive (with our without a tensile core of, for example polyester fibre) which can be caused to melt as by passing the layers between hot rollers (not shown) so that a weak laminate is formed.

Lamina formation in any of the above ways provides adequately constant spacing between the net layer 1 and the backing sheet layer 3 to avoid cavities or voids between the two layer as described hereinbefore, access for the grass roots to find their way between the two layers between the localised adhesion points, areas or layers and ease of stripping the backing sheet 3 from the net layer 1 prior to laying the grass-bearing lamina in situ.

In order to prevent excess of moisture due to accidental over-watering or heavy rain, the base sheet 3 may be formed with perforations (not shown) to allow the escape of excess water.

Figure 5:
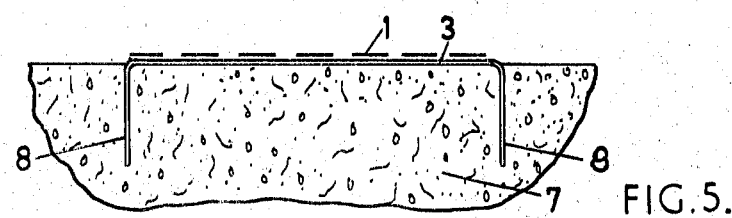

In order to facilitate anchoring the laminate in situ on the prepared soil bed 7 (see FIG. 5), a selvedge 8 of the backing sheet 3 only is provided along each margin of the laminate (see FIGS. 3 and 5) which can be forced into the soil as indicated in FIG. 5 at 9.

The laying of such a pre-formed laminate can be accomplished by unwinding it from a roll carried by a tractor or other vehicle (not shown) and anchoring it in situ on the ground as described above by means of a trailer device (not shown) having disc or like means for burying the selvedges 8 or forcing them into the ground. Following the roll-carrying vehicle and anchoring trailer device, means such as a further trailer device (not shown) may be provided for depositing an even layer of rooting compound and (preferably) prechitted seed on to the laid laminate.

I claim:

1. A method of producing a grass-bearing lamina comprising providing a laminated structure having a first sheet of flexible reticulate material prebonded or prelaminated to a second sheet or film of flexible, substantially water and root impermeable material, said first sheet comprising a first set of parallel strands and a second set of parallel strands extending transversely thereof and bonded thereto, the space between the second sheet and said second set of strands being sufficient to permit root growth therein, distributing over the surface of said flexible reticulate sheet a layer of rooting medium and an adequate quantity of grass seed and subjecting the lamina to correct conditions of light, heat and moisture to promote germination whereby the conducting roots from each seed grow through the layer of rooting medium and through the meshes of said reticulate material so that the root system so produced bonds the rooting medium and the reticulate material sheet into a coherent unit of flexible laminate structure having at one surface growing grass blades and at the other surface (after removal from the impermeable surface) a root structure, wherein the flexible reticulate sheet material is pre-bonded or pre-laminated to the sheet or flim of flexible impermeable material at a plurality of spaced localized points, areas or lines of adhesion whereby the reticulate sheet material is maintained in close or intimate contact with the adjacent surface of the impermeable sheet material while allowing access to the grass roots to find their way between the two sheets between the localized adhesion points, areas or lines, said second sheet being separable from said first sheet following a predetermined growth period.

2. A method of producing a grass-bearing lamina as claimed in claim 1 wherein the reticulate sheet material is bonded to the impermeable sheet material by spaced parallel, substantially continuous, lines of adhesive comprising filaments of hot melt adhesive.

3. A laminate structure for growing grass comprising a first upper sheet of flexible reticulate material having a first set of parallel strands and a second set of parallel strands extending transversely thereof and bonded thereto, said first sheet being bonded to a second lower sheet or film of a flexible, substantially water and root impermeable material, said sheets being bonded by spaced parallel, substantially continuous, filaments of hot melt adhesive, said structure being adapted to receive rooting media and grass seed, the space between the second sheet and said second set of strands being sufficient to permit root growth therein.

* * * * *